United States Patent
Pilgrim (10) Patent No.: US 10,351,156 B1
(45) Date of Patent: Jul. 16, 2019

(54) TWO-WHEELED APPARATUS FOR TRANSPORTING COMMERCIAL AND INDUSTRIAL APPLIANCE UNITS

(71) Applicant: John Robert Pilgrim, Stone Mountain, GA (US)

(72) Inventor: John Robert Pilgrim, Stone Mountain, GA (US)

( * ) Notice: Subject to any disclaimer, the term of this patent is extended or adjusted under 35 U.S.C. 154(b) by 0 days.

(21) Appl. No.: 16/129,869

(22) Filed: Sep. 13, 2018

(51) Int. Cl.
*B62B 5/00* (2006.01)

(52) U.S. Cl.
CPC ........ *B62B 5/0083* (2013.01); *B62B 2202/10* (2013.01); *B62B 2206/02* (2013.01)

(58) Field of Classification Search
CPC ............ B62B 1/00; B62B 5/00; B62B 5/0083
See application file for complete search history.

(56) References Cited

U.S. PATENT DOCUMENTS

| | | | |
|---|---|---|---|
| 2,702,139 A | 2/1955 | Faustine | |
| 3,717,357 A * | 2/1973 | Schaefer | B62B 5/0083 280/35 |
| 3,756,561 A | 9/1973 | Rendelman | |
| 3,831,791 A | 8/1974 | Gonzales | |
| 4,166,638 A * | 9/1979 | De Prado | B62B 5/0083 280/638 |
| 4,275,982 A | 6/1981 | Fisco | |
| 4,334,480 A | 6/1982 | Wallace | |
| 5,318,316 A * | 6/1994 | Shurtleff | B62B 1/268 269/133 |
| 5,620,192 A * | 4/1997 | Demongin | B25H 1/0007 248/582 |
| 5,988,597 A | 11/1999 | Egan | |
| 6,189,478 B1 * | 2/2001 | Myers | B63C 13/00 114/344 |
| 6,926,292 B1 * | 8/2005 | Weeks | B62B 1/26 280/30 |
| 7,320,453 B2 | 1/2008 | Berlyn | |
| 7,367,538 B2 | 5/2008 | Berlyn | |
| 8,210,488 B2 | 7/2012 | Small | |
| 9,592,998 B2 | 3/2017 | Pilgrim | |
| 2002/0071751 A1 | 6/2002 | Brice | |
| 2003/0091417 A1 | 5/2003 | Swann | |
| 2003/0180132 A1 | 9/2003 | Morreim | |

OTHER PUBLICATIONS

Pro-Lift, http://pro-lift.com [last visited: Sep. 13, 2018].

* cited by examiner

*Primary Examiner* — James A Shriver, II
*Assistant Examiner* — James J Triggs
(74) *Attorney, Agent, or Firm* — Thomas | Horstemeyer, LLP (57) ABSTRACT

Disclosed are various embodiments of a two-wheeled apparatus for transporting commercial appliance units on a rooftop or other location without the use of a crane or helicopter. The two-wheeled apparatus may include a chassis configured to support a load of a commercial appliance unit, the chassis comprising a first telescoping member and a second telescoping member. Further, the chassis may include a first mount positioned at a first end of the chassis and a second mount positioned at a second end of the chassis. A first wheel assembly may be coupled to the first distal end of the chassis by a first fixed axle and a second wheel assembly may be coupled to the second distal end of the chassis by a second fixed axle.

20 Claims, 10 Drawing Sheets

TWO-WHEELED APPARATUS FOR TRANSPORTING COMMERCIAL AND INDUSTRIAL APPLIANCE UNITS

BACKGROUND

Various types of vehicles and devices—including cranes, helicopters, forklifts, dollies and carts—may be used to lift and transport objects, such as large HVAC-type appliances. Such vehicles and devices are commonly used for hoisting, moving, and lowering such objects. However, large cranes and helicopters are often prohibitively expensive for use in installing commercial or industrial HVAC-type units or for the lengths of time required to lift and install multiple HVAC-type appliances. Moreover, large cranes and helicopters often require advanced scheduling and several crew members to operate. In addition, commercial and industrial roof-top HVAC-type units are typically very heavy, weighing hundreds to thousands of pounds.

Thus, due to the significant weight of such units, there are often substantial risks when suspending a unit from a crane boom or helicopter rigging over a building for extended amounts of time or in high wind conditions. For instance, in the event of a rigging failure, the unit could fall onto the building roof and possibly through the roof into the building structure, thereby damaging the unit, damaging the building roof and substructure, and possibly injuring building occupants. Furthermore, many building roofs are not substantially strong enough or designed and construct so as to support the weight of traditional heavy lifting equipment, such as a forklift, that could otherwise lift and place a massive commercial or industrial HVAC-type appliance on a flat-surface roof without the use of a crane or helicopter.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure generally relates to apparatuses, devices, methods, and systems for lifting, transporting, positioning and lowering heavy mechanical units and appliances, such as, for example, commercial and industrial heating, air conditioning, and ventilation ("HVAC") units for installation on commercial building rooftops. More specifically, the present disclosure discloses an apparatus that is capable of transporting appliance units that, because of their substantial weight, cannot be safely or cost-effectively picked up, lifted, and/or suspended over a flat-roofed commercial or industrial building by large cranes or helicopters.

According to various embodiments described herein, a two-wheeled apparatus for transporting commercial appliance units on a rooftop or other location is disclosed, which apparatus may be employed to transport commercial appliance units or other large and heavy devices without the use of a crane, helicopter, or other powered lifting or carrying device. A two-wheeled apparatus may include a chassis configured to support a load of a commercial appliance unit, where the chassis includes a first elongated member and a second elongated member. Further, the chassis may include a first mount positioned at a first end of the chassis and a second mount positioned at a second end of the chassis. A first wheel assembly may be coupled to the first distal end of the chassis by a first axle and a second wheel assembly may be coupled to the second distal end of the chassis by a second axle. The two-wheeled apparatus may be positioned, for example, underneath a commercial appliance unit to transport the commercial appliance unit without the use of a crane or other powered device.

As may be appreciated, the embodiments described herein relate to a non-powered device that does not require the use of an engine, motor, battery or hydraulics to transport heavy items. Moreover, the embodiments described herein relate to a non-complex device that may be manufactured at a relatively low cost and device compactable enough to be easily transported in a truck bed or similar area or carried by hand As such, the embodiments described herein for a two-wheeled apparatus provide additional benefits over existing systems that require powered lifting devices, overly complex mechanical systems, and large machines unsuitable for use on a rooftop or other non-ideal situation.

In the following discussion, a general description of various embodiments of a two-wheeled apparatus for transporting commercial and industrial appliance units is provided.

Referring now to the drawings, FIGS. 1, 2, 3, 4A, 4B, 5, 6, and 7 illustrate a two-wheeled apparatus 100 for transporting commercial appliance units in accordance with various embodiments of the disclosure. By way of example, referring first to FIG. 1, the two-wheeled apparatus 100 may include a chassis 105 configured to support a load of a commercial appliance unit. To this end, in some embodiments, the chassis 105 may include a first elongated member 110 and a second elongated member 115. The first elongated member 110 and the second elongated member 115 may be configured to contact an underside of the commercial appliance unit, as will be discussed. Additionally, in various embodiments, the first elongated member 110 may include a first telescoping member (referred to herein as a first telescoping member 110) and the second elongated member 115 may include and be referred to as a second telescoping member (referred to herein as a second telescoping member 115).

Figure 1:
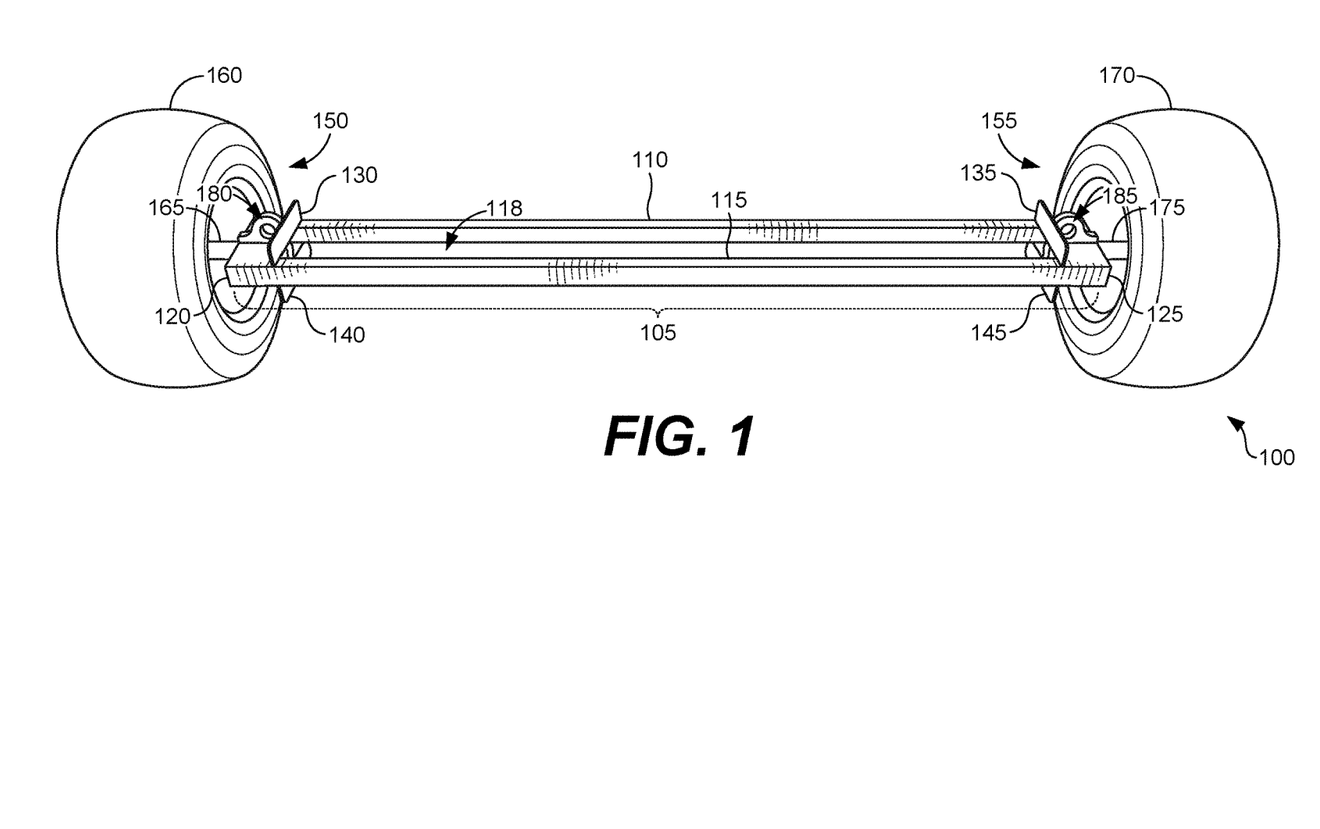
FIG. 1 is a perspective view of a two-wheeled apparatus for supporting and transporting a commercial or industrial appliance unit in accordance with various embodiments of the present disclosure.
Figure 2:
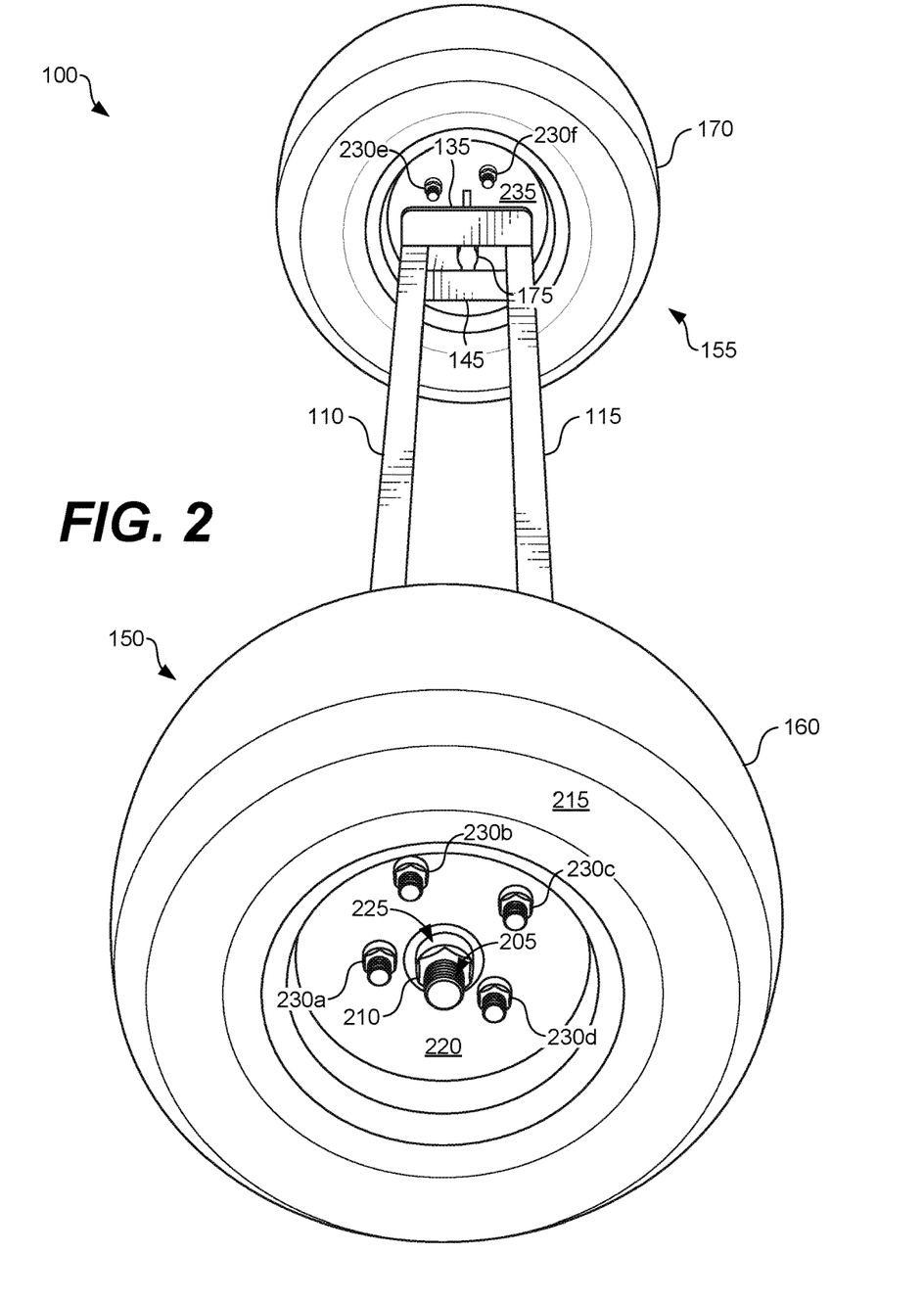
FIG. 2 is another perspective view of the two-wheeled apparatus in accordance with various embodiments of the present disclosure.

In various embodiments, the chassis 105 may include a recess 118 positioned between the first elongated member 110 and the second elongated member 115. In other words, the first elongated member 110 and the second elongated member 115 are not directly adjacent as there is a recess 118 positioned between. In some embodiments, the recess 118 may have a length substantially similar to a length of the first elongated member 110 and the second elongated member 115, as shown in FIG. 1 and FIG. 2. By not being directly adjacent to one another, the first elongated member 110 and the second elongated member 115 provide support at different locations on an underside of a commercial appliance unit.

Further, the chassis 105 may include a first mount 120 positioned at a first distal end of the chassis 105. The first mount 120 may be coupled to a first terminal end of the first elongated member 110 and a first end of the second telescoping member 115, as shown in FIG. 1. Similarly, the chassis 105 may include a second mount 125 positioned at a second distal end of the chassis 105. Similar to the first mount 120, the second mount 125 may be coupled to a second end of the first telescoping member 110 and a second end of the second telescoping member 115. In various embodiments, the first mount 120 and the second mount 125 may include substantially rectangular mounts. As such, the first mount 120 may be referred to as a first rectangular mount in some embodiments, while the second mount 125 may be referred to as a second rectangular mount. In alternative embodiments, the first mount 120 and the second mount 125 may include other shapes and dimensions while not deviating from the scope of the present disclosure.

As shown in FIG. 1, in some embodiments, the first elongated member 110 and the second elongated member 115 may have a length and a height substantially similar to one another. More specifically, the first mount 120 and the second mount 125 may have a height substantially similar to a height of both the first elongated member 110 and the second elongated member 115.

The chassis 105 may further include a first flange 130, a second flange 135, a third flange 140, and a fourth flange 145 configured to contact and secure a respective side of a commercial appliance unit as well as retain the commercial appliance unit during transport. The first flange 130 may be positioned on an upper side of the first mount 120, whereas the third flange 140 may be positioned on a bottom side of the first mount 120. Similarly, the third flange 135 may be positioned on an upper side of the second mount 125, whereas the fourth flange 145 may be positioned on a bottom side of the second mount 125.

While FIG. 1 illustrates four flanges 130, 135, 140, and 145, in some embodiments, the chassis 105 may include only the first flange 130 and the second flange 135 or, in another embodiments, only the third flange 140 and the fourth flange 145. However, by having four flanges 130, 135, 140, and 145, both the top side and the bottom side of the first elongated member 110 and the second elongated member 115 are suitable for carrying and transporting a commercial appliance unit.

As may be appreciated, the flanges 130, 135, 140, and 145 may include protruding surfaces that are perpendicular to the first elongated member 110 and the second elongated member 115. Additionally, in some embodiments, the flanges 130, 135, 140, and 145 may directly couple the first elongated member 110 to the second elongated member 115. Also, the first mount 120 and the second mount 125 may further couple the first elongated member 110 to the second elongated member 115. Additionally, in some embodiments, the first flange 130, the second flange 135, the third flange 140, and the fourth flange 140 may include a rectangular bracket or a rounded-edged rectangular bracket that protrudes perpendicular to the first elongated member 110 and the second elongated member 115.

Further, the two-wheeled apparatus 100 may include a first wheel assembly 150 and a second wheel assembly 155. The first wheel assembly 150 may include a first wheel 160 and a first axle 165. Likewise, the second wheel assembly 155 may include a second wheel 170 and a second axle 175. The first wheel assembly 150 and the first wheel 160 may be coupled to the first distal end of the chassis 105 via the first axle 165. The second wheel assembly 155 and the second wheel 170 may be coupled to the second distal end of the chassis 105 via the second axle 175.

The first wheel 160 and the second wheel 170 may each include a rim and a tire configured to support a commercial appliance unit having a weight up to 2,200 lbs. In some embodiments, the first wheel 160 and the second wheel 170 may each include a rim and a tire configured to support a commercial appliance unit having a weight in the range of approximately 1,500 lbs. to 2,200 lbs., although other weights may be employed depending on a type of commercial appliance unit being transported. Additionally, the tire of the first wheel 160 and the second wheel 170 may have a tire tread suitable for transporting commercial appliance units across commercial building rooftops, which may include tar, gravel, concrete, tile, or other surface materials.

In some embodiments, the first axle 165 and the second axle 175 may include fixed axles, meaning the first axle 165 and the second axle 175 do not rotate. Accordingly, in some embodiments, the first axle 165 and the second axle 175 may each include an elongated cylinder at least partially positioned in and secured at an interior of the first mount 120 and the second mount 125, respectively. For instance, as shown in FIG. 1, an end of the elongated cylinder of the first axle 165 may be positioned in an interior of the first mount 120 such that a terminal end of the first axle 165 is substantially parallel to the first flange 130. The terminal end of the first axle 165 may be welded or otherwise secured to the first mount 120. Similarly, an end of the elongated cylinder of the second axle 175 may be positioned in an interior of the second mount 125 such that a terminal end of the second axle 175 is substantially parallel to the second flange 135. Also, the terminal end of the second axle 175 may be welded or otherwise secured to the second mount 125.

In various embodiments, the chassis 105 of the two-wheeled apparatus 100 may further include a first bracket 180, a second bracket 185, a third bracket 190, and a fourth bracket 195. The first bracket 180 may be positioned on the top side of the first mount 120. Further, the first bracket 180 may be configured to retain a securing element or at least an end of the securing element. In various embodiments, a securing element may comprise, for example, a chain, cable sling, nylon slings, strap, hook, ratchet, come-along device, any other appropriate type of support, or combinations thereof. As such, in some embodiments, each of the first bracket 180, the second bracket 185, the third bracket 190, and the fourth bracket 195 may include an eye bracket having an aperture or other mechanism configured to receive a hook or other connection mechanism of a securing element.

In various embodiments, the second bracket 185 may be positioned on the top side of the second mount 125, whereas the fourth bracket 195 may be positioned on the bottom side of the second mount 125. The third bracket 190 may be positioned on the bottom side of the first mount 120.

Also, in various embodiments, the first bracket 180 may be positioned directly adjacent to and perpendicular to the first flange 130, the second bracket 185 may be positioned directly adjacent to and perpendicular to the second flange 135, the third bracket 190 is positioned directly adjacent to and perpendicular to the third flange 140, and the fourth bracket 195 is positioned directly adjacent to and perpendicular to the fourth flange 145.

By virtue of the positions of the various components of the chassis 105 and the wheel assemblies 150, 155, the two-wheeled apparatus 100 and/or the chassis 105 may be described as being substantially symmetrical, as clearly shown in at least FIG. 1. To this end, an operator attempting to position the two-wheeled apparatus 100 beneath a commercial appliance unit would not be required to rotate the two-wheeled apparatus 100 to locate the side required for placement of the unit. Instead, both a top surface and a bottom surface of the first telescoping member 110 are configured to contact the underside of the commercial appliance unit, while both a top surface and a bottom surface of the second telescoping member 115 are also configured to contact the underside of the commercial appliance unit.

Figure 3:
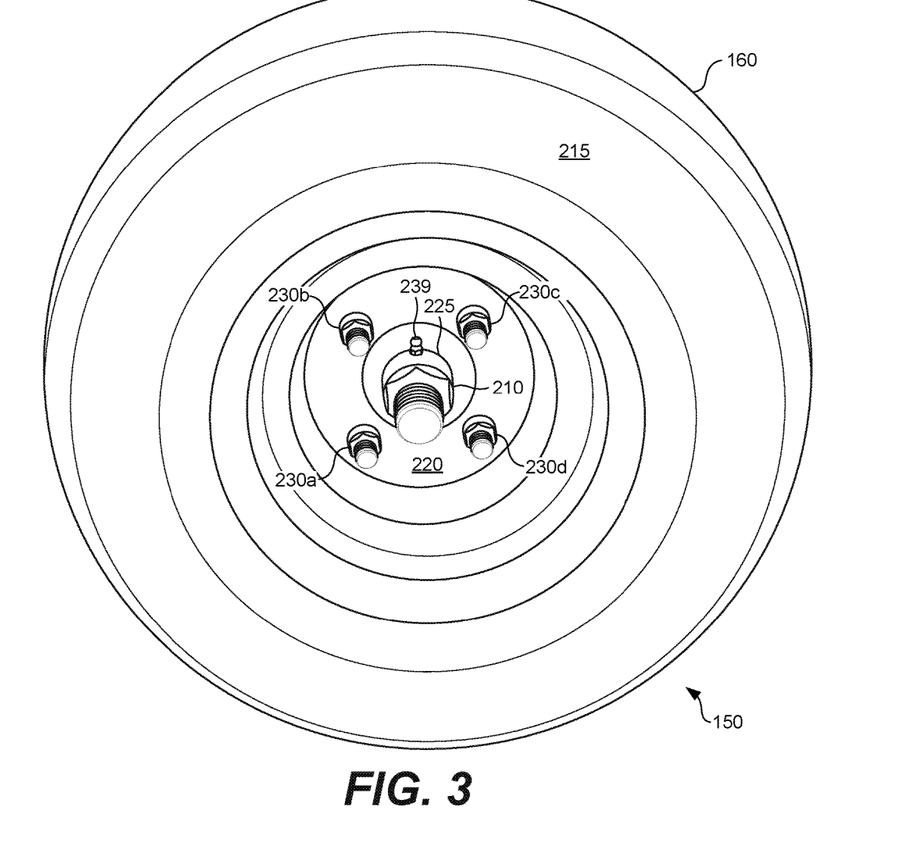
FIG. 3 is an enlarged side view of the two-wheeled apparatus in accordance with various embodiments of the present disclosure.

Referring now to FIG. 2, in embodiments in which the first axle 165 and the second axle 175 include an elongated cylindrical body, the elongated cylindrical body of the first axle 165 and the second axle 175 may include a threaded distal portion 205. As such, the first wheel 160 and the second wheel 170 may be secured to the first axle 165 and the second axle 175, respectively, using a bolt 210 or other suitable connection mechanism. As noted above, the first wheel assembly 150 and the second wheel assembly 155 may each include a tire 215 and a rim 220. In some embodiments, the first wheel assembly 150 and the second wheel assembly 155 may further include a sleeve 225 protruding from an inner portion of the tire 215, where the sleeve 225 is configured to receive and retain a respective one of the axles 165, 175. One or more bolts and screws 230a . . . 230f, or other suitable connection mechanisms, of the first wheel assembly 150 and the second wheel assembly 155 may be employed to secure a housing for the sleeve 225 (referred to herein as a sleeve housing 235) to the rim 220, as will be discussed. FIG. 3 illustrates an enlarged view of the first wheel assembly 150, which includes a pin 239 that may further secure the first axle 165 and the second axle 175 to a respective one of the rims 220.

Figure 4A:
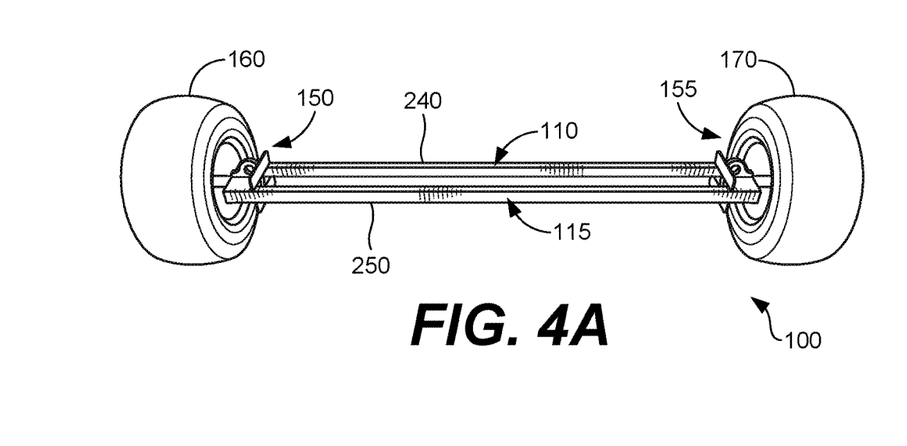
FIG. 4A is a perspective view of the two-wheeled apparatus shown in a retracted state in accordance with various embodiments of the present disclosure.
Figure 4B:
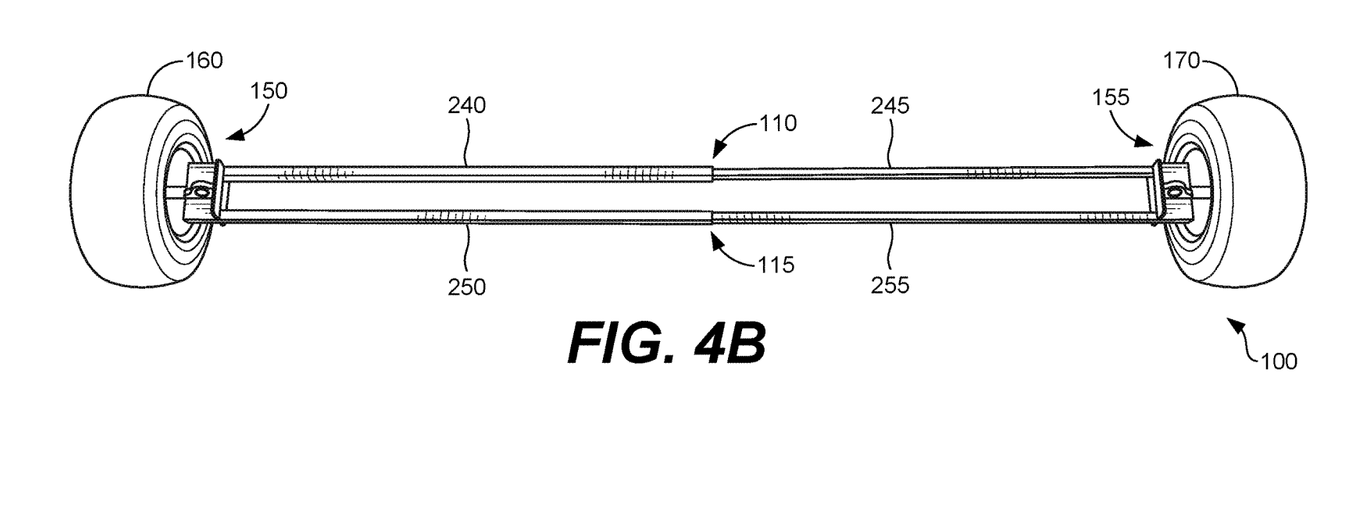
FIG. 4B is a perspective view of the two-wheeled apparatus shown in an elongated state in accordance with various embodiments of the present disclosure.

Turning now to FIG. 4A, the two-wheeled apparatus 100 is shown in a fully enclosed or retracted state where a width of the two-wheeled apparatus 100 has been reduced via the first telescoping member 110 and the second telescoping member 115. Such a state may be sufficient for transporting smaller commercial appliance units, or for transporting the two-wheeled apparatus 100 while not in use. FIG. 4B, on the other hand, shows the two-wheeled apparatus 100 in a fully elongated, opened, or extended state, where the first telescoping member 110 and the second telescoping member 115 are fully telescoped. As may be appreciated, the width of the two-wheeled apparatus 100 may be adjusted and customized based on a size of a commercial appliance unit being transported. As such, the two-wheeled apparatus 100 or the chassis 105 thereof is selectably extendable to configure a width of the chassis to conform to a width of the commercial appliance unit.

The first telescoping member 110 may include a first housing portion 240 and a first slidable portion 245 configured to reside and slide within the first housing portion 240 in opposing longitudinal directions. Similarly, the second telescoping member 115 may include a second housing portion 250 and a second slidable portion 255 configured to reside and slide within the second housing portion 250 in opposing longitudinal directions. In some embodiments, the two-wheeled apparatus 100 may include a locking mechanism (not shown) that prevents the longitudinal movement of the first slidable portion 245 and the second slidable portion 255. FIG. 4B also shows the ability of the two-wheeled apparatus 100 to pivot by rotation of the first wheel assembly 150 and the second wheel assembly 155.

Figure 5:
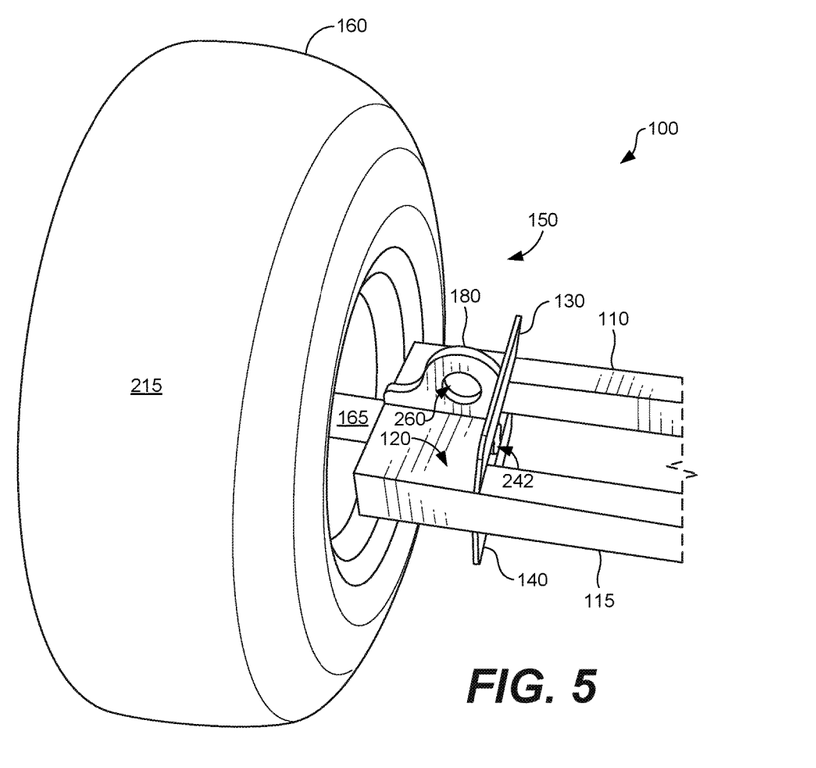
FIG. 5 is an enlarged perspective view of the two-wheeled apparatus shown in accordance with various embodiments of the present disclosure.
Figure 6:
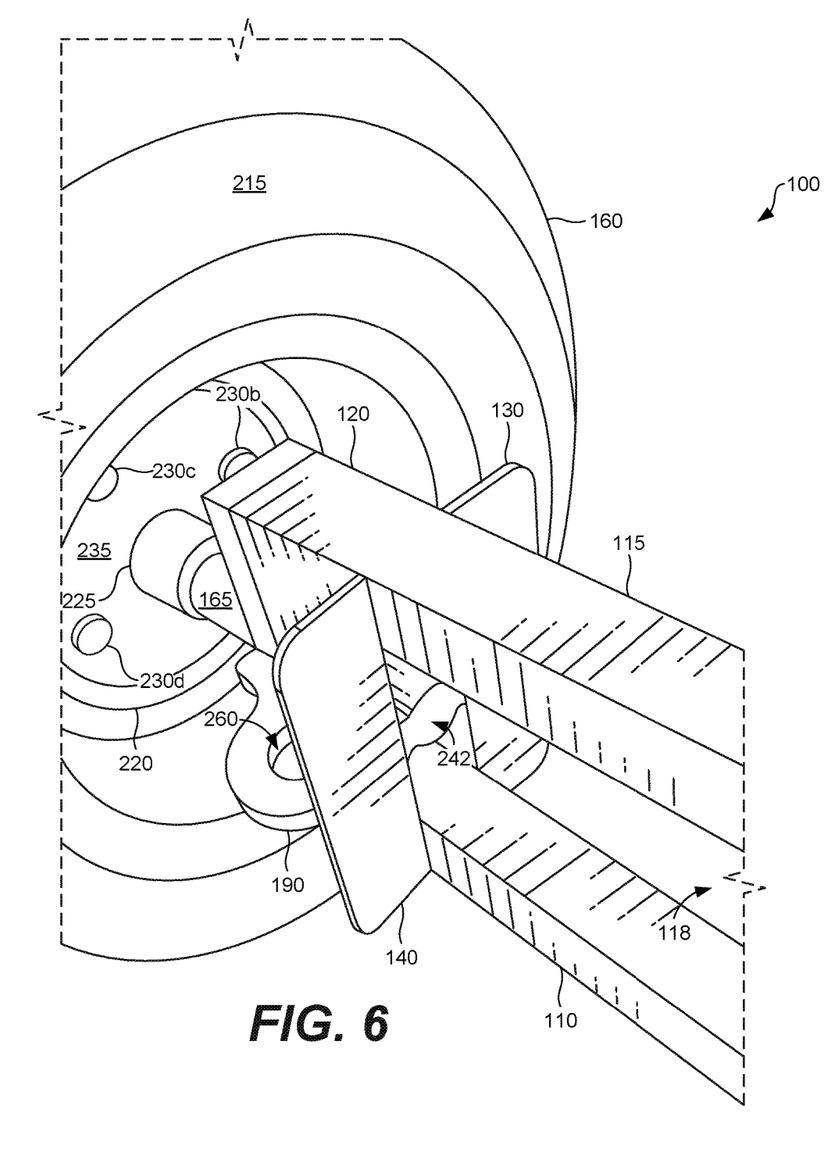
FIG. 6 is another enlarged perspective view of the two-wheeled apparatus shown in accordance with various embodiments of the present disclosure.
Figure 7:
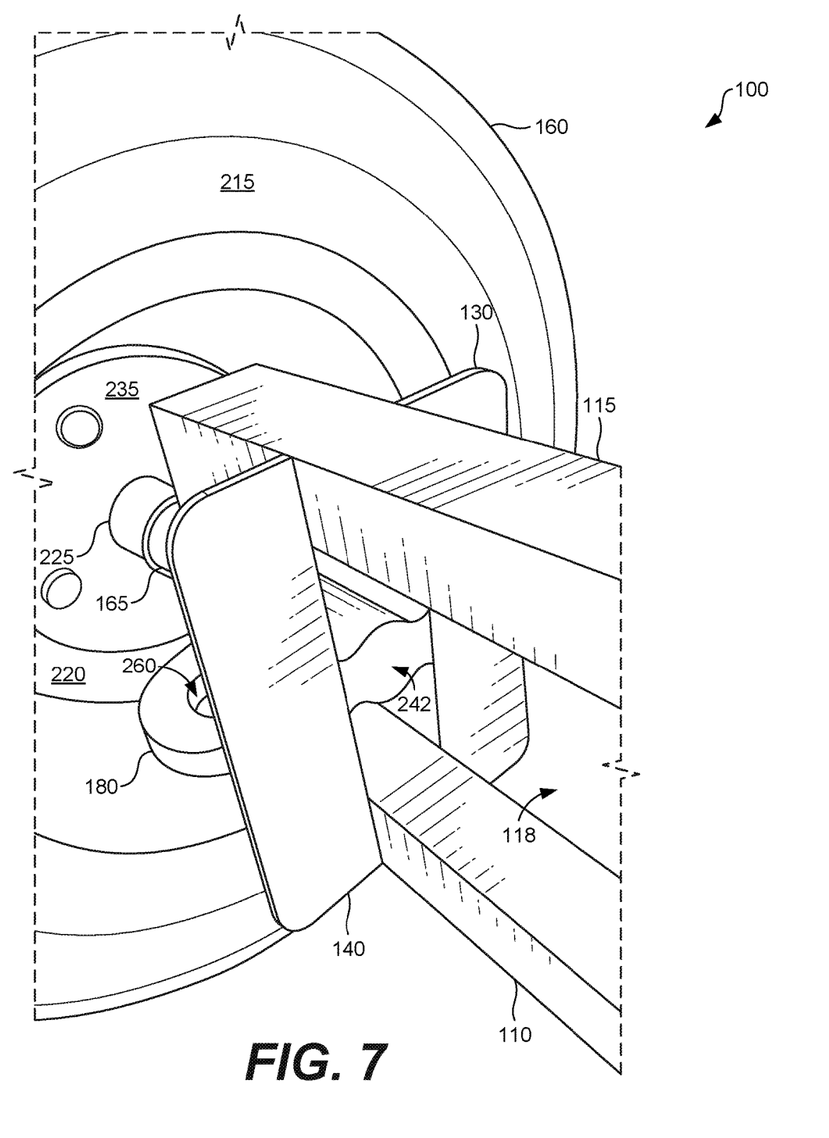
FIG. 7 is another enlarged perspective view of the two-wheeled apparatus shown in accordance with various embodiments of the present disclosure.

Turning now to FIG. 5, FIG. 6, and FIG. 7, enlarged views of the first of the two wheel assemblies 155 and a first distal portion of the chassis 105 of the two-wheeled apparatus 100 are shown from different perspectives. As noted above, in some embodiments, the first axle 165, as well as the second axle 175, may each include an elongated cylinder at least partially positioned in and secured at an interior of the first mount 120 and the second mount 125, respectively, such that the first axle 165 and the second axle 175 do not rotate along with the wheels 160, 170. For instance, as shown in FIG. 5, an end of the elongated cylinder of the first axle 165 may be positioned in an interior of the first mount 120 such that a terminal end 242 of the first axle 165 is substantially parallel to the first flange 130. A terminal end 242 of the first axle 165 may be welded or otherwise secured to the first mount 120. Similarly, an end of the elongated cylinder of the second axle 175 may be positioned in an interior of the second mount 125 such that a terminal end (not shown) of the second axle 175 is substantially parallel to the second flange 135. Also, the terminal end of the second axle 175 may be welded or otherwise secured to the second mount 125.

Also noted above, the first bracket 180 may be positioned on the top side of the first mount 120 while the third bracket 190 (not shown in FIG. 5) may be positioned on the bottom side of the first mount 120. The first bracket 180, along with the second bracket 185, the third bracket 190, and the fourth bracket 195, may be configured to retain a securing element or at least an end of the securing element. In some embodiments, each of the first bracket 180, the second bracket 185, the third bracket 190, and the fourth bracket 195 may include an eye bracket having an aperture 260 or other mechanism configured to receive a hook or other connection mechanism of a securing element. As noted above, one or more bolts and screws 230a . . . 230f, or other suitable connection mechanisms, of the first wheel assembly 150 and the second wheel assembly 155 may be employed to secure a sleeve housing 235 to the rim.

Figure 8:
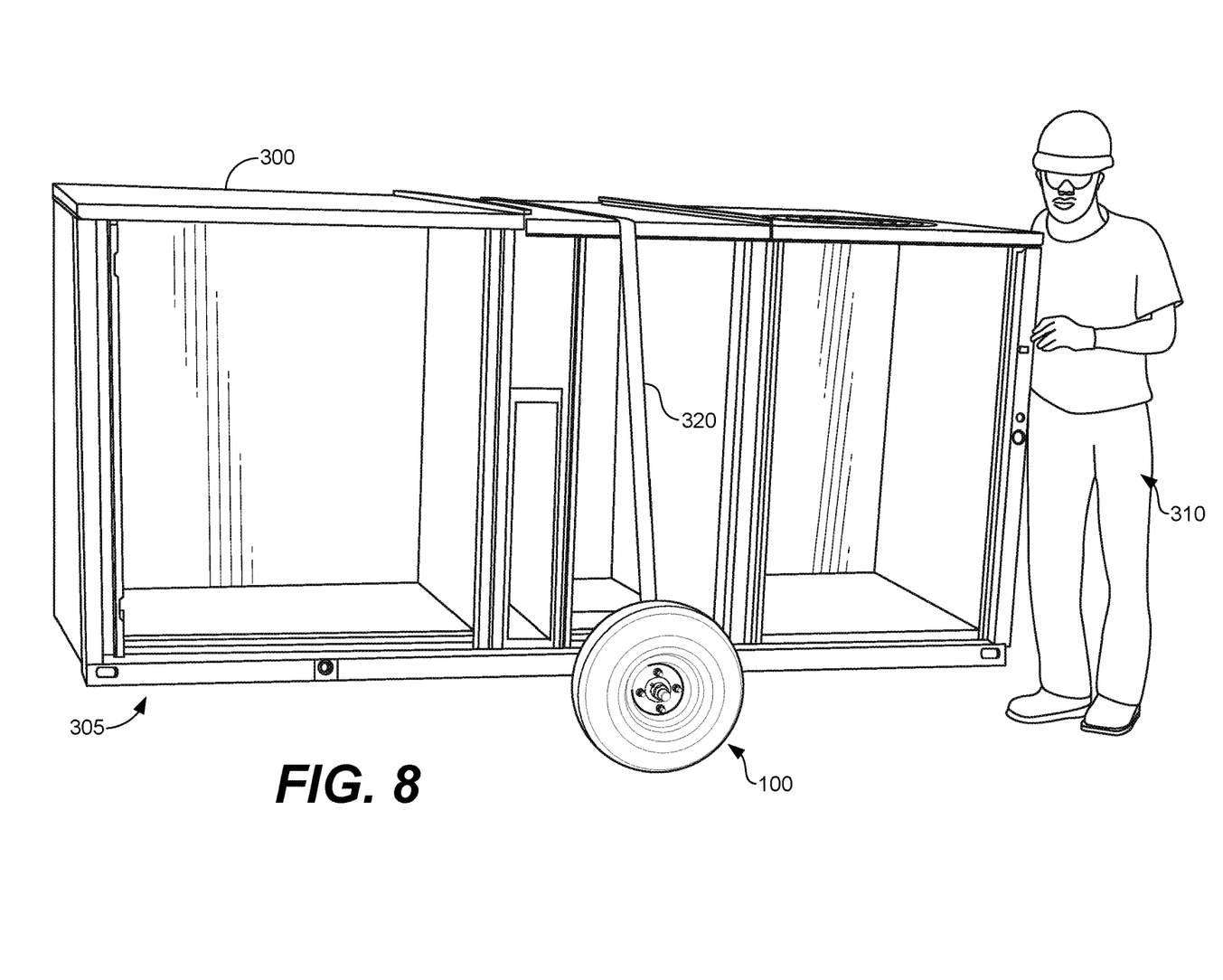
FIG. 8 is an example of operation of the two-wheeled apparatus for transporting a commercial appliance unit in accordance with various embodiments of the present disclosure.
Figure 9:
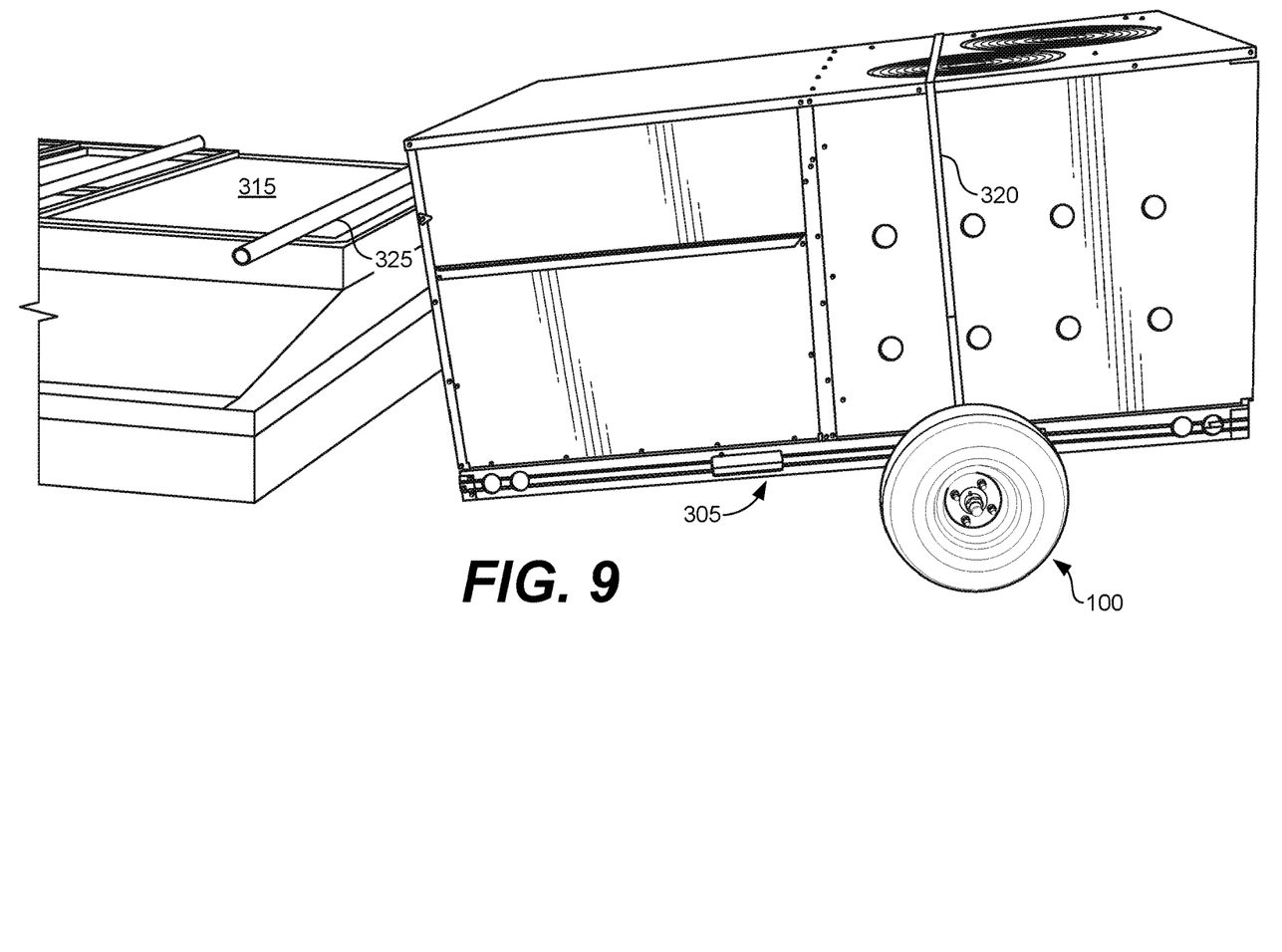
FIG. 9 is another example of operation of the two-wheeled apparatus for transporting a commercial appliance unit in accordance with various embodiments of the present disclosure.
Figure 10:
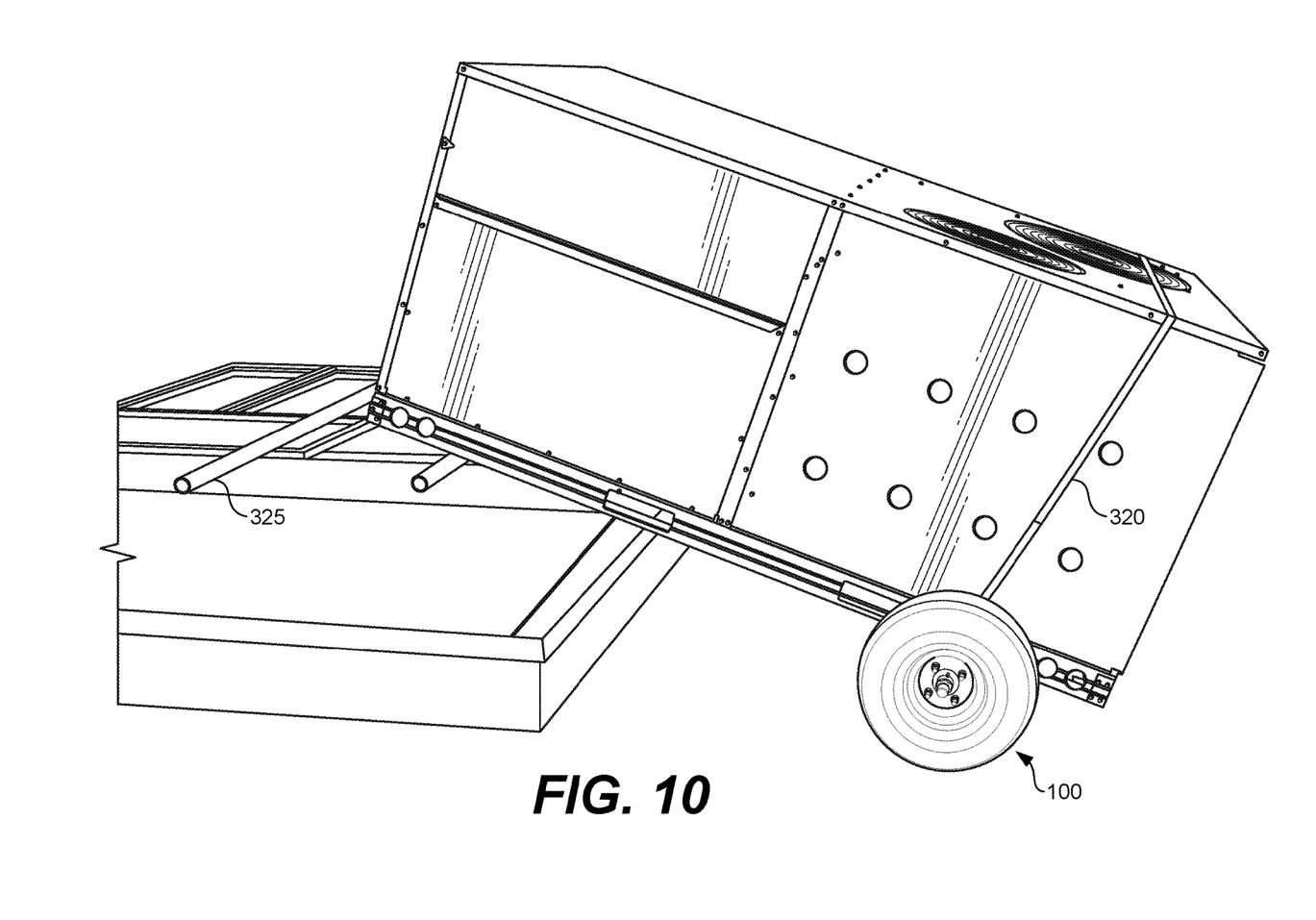
FIG. 10 is another example of operation of the two-wheeled apparatus for transporting a commercial appliance unit in accordance with various embodiments of the present disclosure.

Referring now to FIG. 8, FIG. 9, and FIG. 10, the two-wheeled apparatus 100 is shown having a commercial appliance unit 300 positioned thereon such that the commercial appliance unit 300 may be moved across a surface, such as a rooftop. In some embodiments, the two-wheeled apparatus 100 may be positioned at or near a balance point on an underside 305 of the commercial appliance unit 300 such that the two-wheeled apparatus 100 substantially supports a load of the commercial appliance unit 300. Also, in FIG. 8, FIG. 9, and FIG. 10, an in-use configuration of the two-wheeled apparatus 100 is shown with the ability to transport the commercial appliance unit 300 in accordance with various embodiments of the present disclosure.

As may be appreciated, when the commercial appliance unit 300 is suitably positioned on the two-wheeled apparatus 100, the commercial appliance unit 300 may be easily moved by one or more operators 310 from a first position to a second position for placement of the commercial appliance unit 300 on a pad 315 or other suitable location.

Further, in various embodiments, the commercial appliance unit 300 may be further secured to the chassis 105 of the two-wheeled apparatus 100 by positioning a first end of a securing element 320 in one of the first bracket 180 or the third bracket 190, wrapping a body of the securing element 320 over a top and side portion of the commercial appliance unit 300, and positioning a second end of the securing element 320 in one of the second bracket 185 or the fourth bracket 195. As shown in FIG. 10, a position of the two-wheeled apparatus 100 at the underside 305 of the commercial appliance unit 300 may be adjusted from the balance point to another position, for instance, as the commercial appliance unit 300 is placed on the pad 315. Further, in some embodiments, one or more pipes 325 may be used to assist with rolling the commercial appliance unit 300 during placement on a suitable portion of the pad 315.

Based on the materials, shape, and design of the chassis 105, as well as materials, shape, and design of the components of the first wheel assembly 150 and the second wheel assembly 155, the two-wheeled apparatus 100 may be configured to support a commercial appliance unit having a weight up to 2,200 lbs. (~1,000 kg). In some embodiments, the two-wheeled apparatus 100 may be configured to support a commercial appliance unit having a weight in the range of approximately 1,500 lbs. (~680 kg) to 2,200 lbs. (~1,000 kg), although other weights may be employed depending on a type of commercial appliance unit 300 being transported.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A two-wheeled apparatus for transporting commercial appliance units, comprising:
    a chassis configured to support a load of a commercial appliance unit when positioned at a balance point of the commercial appliance unit, the chassis comprising:
        a first telescoping member; and
        a second telescoping member;
        wherein the first telescoping member and the second telescoping member are configured to contact an underside of the commercial appliance unit and are selectably extendable to configure a width of the chassis to conform to a width of the commercial appliance unit;
        a first rectangular mount positioned at a first distal end of the chassis and coupled to a first end of the first telescoping member and a first end of the second telescoping member;
        a second rectangular mount positioned at a second distal end of the chassis and coupled to a second end of the first telescoping member and a second end of the second telescoping member;
        a first flange positioned on an upper side of the first rectangular mount configured to secure a first side of the commercial appliance unit to the chassis; and
        a second flange positioned on an upper side of the second rectangular mount configured to secure a second side of the commercial appliance unit to the chassis;
    a first wheel assembly comprising a first wheel, the first wheel assembly being coupled to the first rectangular mount at the first distal end of the chassis by a first fixed axle;
    a second wheel assembly comprising a second wheel, the second wheel assembly being coupled to the second rectangular mount at the second distal end of the chassis by a second fixed axle; and
    wherein the two-wheeled apparatus has only two wheels, the two wheels comprising the first wheel and the second wheel.

2. The two-wheeled apparatus of claim 1, wherein the chassis further comprises:
    a third flange positioned on a bottom side of the first rectangular mount configured to secure the first side of the commercial appliance unit to the chassis; and
    a fourth flange positioned on a bottom side of the second rectangular mount configured to secure the second side of the commercial appliance unit to the chassis.

3. The two-wheeled apparatus of claim 2, wherein the chassis further comprises:
    a first eye bracket positioned on a top side of the first rectangular mount configured to retain a first end of a securing element; and
    a second eye bracket positioned on a top side of the second rectangular mount configured to retain a second end of the securing element.

4. The two-wheeled apparatus of claim 3, wherein the chassis further comprises:
    a third eye bracket positioned on a bottom side of the first rectangular mount configured to retain the first end of the securing element; and
    a fourth eye bracket positioned on a bottom side of the second rectangular mount configured to retain a second end of the securing element.

5. The two-wheeled apparatus of claim 4, wherein:
    the first eye bracket is positioned directly adjacent to and perpendicular to the first flange;
    the second eye bracket is positioned directly adjacent to and perpendicular to the second flange;
    the third eye bracket is positioned directly adjacent to and perpendicular to the third flange; and
    the fourth eye bracket is positioned directly adjacent to and perpendicular to the fourth flange.

6. The two-wheeled apparatus of claim 5, wherein the first telescoping member and the second telescoping member of the chassis are substantially symmetrical.

7. The two-wheeled apparatus of claim 1, wherein:
    both a top surface and a bottom surface of the first telescoping member is configured to contact the underside of the commercial appliance unit; and both a top surface and a bottom surface of the second telescoping member is configured to contact the underside of the commercial appliance unit.

8. The two-wheeled apparatus of claim 1, wherein the chassis further comprises a recess positioned between the first telescoping member and the second telescoping member.

9. The two-wheeled apparatus of claim 8, wherein the recess has a length substantially similar to a length of the first telescoping member and the second telescoping member.

10. The two-wheeled apparatus of claim 1, wherein the two-wheeled apparatus is configured to support a weight of the commercial appliance unit up to 2,200 lbs.

11. A system for transporting commercial appliance units, comprising:
    a chassis configured to support a load of a commercial appliance unit at a balance point of the commercial appliance unit when the chassis is positioned beneath the commercial appliance unit, the chassis comprising:
        a first elongated member; and
        a second elongated member, the first elongated member and the second elongated member comprising at least one side configured to contact an underside of the commercial appliance unit;
        a first mount positioned at a first distal end of the chassis and coupled to a first end of the first elongated member and a first end of the second elongated member;
        a second mount positioned at a second distal end of the chassis and coupled to a second end of the first elongated member and a second end of the second elongated member;
        a first flange positioned on an upper side of the first mount configured to secure a first side of the commercial appliance unit to the chassis; and
        a second flange positioned on an upper side of the second mount configured to secure a second side of the commercial appliance unit to the chassis;
    a first wheel assembly comprising a first wheel, the first wheel assembly being coupled to the first distal end of the chassis by a first fixed axle;
    a second wheel assembly comprising a second wheel, the second wheel assembly being coupled to the second distal end of the chassis by a second fixed axle; and
    wherein the system includes only two wheels, the two wheels comprising the first wheel and the second wheel.

12. The system of claim 11, wherein:
the first mount is a first rectangular mount;
the second mount is a second rectangular mount; and
the chassis further comprises:
    a third flange positioned on a bottom side of the first rectangular mount configured to secure the first side of the commercial appliance unit to the chassis; and
    a fourth flange positioned on a bottom side of the second rectangular mount configured to secure the second side of the commercial appliance unit to the chassis.

13. The system of claim 12, wherein the chassis further comprises:
    a first eye bracket positioned on a top side of the first rectangular mount configured to retain a first end of a securing element;
    a second eye bracket positioned on a top side of the second rectangular mount configured to retain a second end of the securing element;
    a third eye bracket positioned on a bottom side of the first rectangular mount configured to retain the first end of the securing element; and
    a fourth eye bracket positioned on a bottom side of the second rectangular mount configured to retain a second end of the securing element.

14. The system of claim 13, wherein:
the first eye bracket is positioned directly adjacent to and perpendicular to the first flange;
the second eye bracket is positioned directly adjacent to and perpendicular to the second flange;
the third eye bracket is positioned directly adjacent to and perpendicular to the third flange; and
the fourth eye bracket is positioned directly adjacent to and perpendicular to the fourth flange.

15. The system of claim 11, wherein:
the first elongated member is a first telescoping member; and
the second elongated member is a second telescoping member;
the chassis is selectably extendable to adjust a width of the chassis relative to a width of the commercial appliance unit; and
the chassis further comprises a recess positioned between the first telescoping member and the second telescoping member, wherein the recess has a length substantially similar to a length of the first telescoping member and the second telescoping member.

16. The system of claim 11, wherein the chassis is configured to support a weight of the commercial appliance unit being between 1,500 lbs. and 2,200 lbs.

17. A method for transporting commercial appliance units, comprising:
    providing a two-wheeled apparatus having only two wheels, the two-wheeled apparatus comprising:
        a chassis configured to support a load of a commercial appliance unit, the chassis comprising:
            a first telescoping member; and
            a second telescoping member;
            wherein the first telescoping member and the second telescoping member comprise a bottom side and a top side both being configured to contact an underside of the commercial appliance unit and are selectably extendable to configure a width of the chassis to conform to a width of the commercial appliance unit;
            a first rectangular mount positioned at a first distal end of the chassis and coupled to a first end of the first telescoping member and a first end of the second telescoping member;
            a second rectangular mount positioned at a second distal end of the chassis and coupled to a second end of the first telescoping member and a second end of the second telescoping member;
            a first flange positioned on an upper side of the first rectangular mount configured to secure a first side of the commercial appliance unit to the chassis; and
            a second flange positioned on an upper side of the second rectangular mount configured to secure a second side of the commercial appliance unit to the chassis;
        a first wheel assembly comprising a first wheel, the first wheel assembly being coupled to the first rectangular mount at the first distal end of the chassis by a first fixed axle; and a second wheel assembly comprising a second wheel, the second wheel assembly being coupled to the second rectangular mount at the second distal end of the chassis by a second fixed axle;

wherein the two-wheeled apparatus has only two wheels, the two wheels comprising the first wheel and the second wheel;

positioning the two-wheeled apparatus at or near a balance point on the underside of the commercial appliance unit such that the two-wheeled apparatus supports a load of the commercial appliance unit; and moving the commercial appliance unit from a first position to a second position using the two-wheeled apparatus for placement of the commercial appliance unit.

18. The method of claim 17, wherein:

the chassis further comprises:
- a first eye bracket positioned on a top side of the first mount configured to retain a first end of a securing element;
- a second eye bracket positioned on a top side of the second mount configured to retain a second end of the securing element;
- a third eye bracket positioned on a bottom side of the first mount configured to retain the first end of the securing element; and
- a fourth eye bracket positioned on a bottom side of the second mount configured to retain a second end of the securing element; and the method further comprises securing the commercial appliance unit to the chassis by:
- positioning the first end of the securing element in one of the first eye bracket or the third eye bracket;
- wrapping a body of the securing element over a top portion of the commercial appliance unit; and
- positioning the second end of the securing element in one of the second eye bracket or the fourth eye bracket.

19. The method of claim 17, further comprising adjusting a position of the two-wheeled apparatus at the underside of the commercial appliance unit from the balance point to another position as the commercial appliance unit is placed on a pad.

20. The method of claim 17, wherein the commercial appliance unit has a weight between 1,500 lbs. and 2,200 lbs.

* * * * *